(12) United States Patent
Kupryjanow et al.

(10) Patent No.: US 10,573,301 B2
(45) Date of Patent: Feb. 25, 2020

(54) NEURAL NETWORK BASED TIME-FREQUENCY MASK ESTIMATION AND BEAMFORMING FOR SPEECH PRE-PROCESSING

(71) Applicant: INTEL CORPORATION, Santa Clara, CA (US)

(72) Inventors: Adam Kupryjanow, Gdansk (PL); Kuba Lopatka, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/023,455

(22) Filed: Jun. 29, 2018

(65) Prior Publication Data

US 2019/0043491 A1 Feb. 7, 2019

Related U.S. Application Data

(60) Provisional application No. 62/673,238, filed on May 18, 2018.

(51) Int. Cl.
*G10L 15/20* (2006.01)
*G10L 15/16* (2006.01)
(Continued)

(52) U.S. Cl.
CPC ............ *G10L 15/20* (2013.01); *G10L 15/16* (2013.01); *G10L 21/0232* (2013.01); *G10L 25/84* (2013.01); *G10L 2021/02082* (2013.01)

(58) Field of Classification Search
CPC ..... G10L 15/20; G10L 21/0208; G10L 25/84; G10L 21/0232; G10L 15/16;
(Continued)

(56) References Cited

U.S. PATENT DOCUMENTS

2011/0158418 A1* 6/2011 Bai .......................... H04B 3/23
381/66
2014/0274218 A1* 9/2014 Kadiwala ................ G10L 15/08
455/570

(Continued)

OTHER PUBLICATIONS

Cauchi, B. et al., "Combination of MVDR beamforming and single-channel spectral processing for enhancing noisy and reverberant speech," EURASIP J. Adv. Sig. Proc., vol. 2015, pp. 61, 2015.

(Continued)

*Primary Examiner* — Bharatkumar S Shah
(74) *Attorney, Agent, or Firm* — Finch & Maloney PLLC

(57) ABSTRACT

Techniques are provided for pre-processing enhancement of a speech signal. A methodology implementing the techniques according to an embodiment includes performing de-reverberation processing on signals received from an array of microphones, the signals comprising speech and noise. The method also includes generating time-frequency masks (TFMs) for each of the signals. The TFMs indicate the probability that a time-frequency component of the signal associated with that TFM element includes speech. The TFM generation is based on application of a recurrent neural network to the signals. The method further includes generating steering vectors based on speech covariance matrices and noise covariance matrices. The TFMs are employed to filter speech components of the signals, for calculation of the speech covariance, and noise components of the signals for calculation of the noise covariance. The method further includes performing beamforming on the signals, based on the steering vectors, to generate the enhanced speech signal.

20 Claims, 11 Drawing Sheets
(2 of 11 Drawing Sheet(s) Filed in Color)

(51) Int. Cl.
*G10L 21/0232* (2013.01)
*G10L 25/84* (2013.01)
*G10L 21/0208* (2013.01)

(58) Field of Classification Search
CPC ........... G10L 2021/02166; G10L 25/30; G10L 15/00; G10L 2021/02082
USPC ........................................................ 704/232
See application file for complete search history.

(56) References Cited

U.S. PATENT DOCUMENTS

| | | | | |
|---|---|---|---|---|
| 2015/0310857 | A1* | 10/2015 | Habets | G10L 25/78 704/240 |
| 2016/0111108 | A1* | 4/2016 | Erdogan | G10L 21/0216 704/202 |
| 2017/0365255 | A1 | 12/2017 | Kupryjanow et al. | |
| 2017/0365271 | A1 | 12/2017 | Kupryjanow et al. | |
| 2017/0365274 | A1 | 12/2017 | Maziewski et al. | |

OTHER PUBLICATIONS

Warsitz, E. and R. Haeb-Umbach, "Blind acoustic beamforming based on generalized eigenvalue decomposition," IEEE Transactions on Audio, Speech, and Language Processing, vol. 15, No. 5, pp. 1529-1539, Jul. 2007.
Souden, M. et al., "On optimal frequency-domain multichannel linear filtering for noise reduction," IEEE Transactions on Audio, Speech, and Language Processing, vol. 18, No. 2, pp. 260-276, Feb. 2010.
Yoshioka, T. and T. Nakatani, "Generalization of multi-channel linear prediction methods for blind mimo impulse response shortening," IEEE Transactions on Audio, Speech, and Language Processing, vol. 20, No. 10, pp. 2707-2720, Dec. 2012.
Higuchi, T. et al, "Robust MVDR beamforming using time-frequency masks for online/offline ASR in noise," in 2016 IEEE International Conference on Acoustics, Speech and Signal Processing (ICASSP), Mar. 2016, pp. 5210-5214.
Cohen, I. "Noise spectrum estimation in adverse environments: improved minima controlled recursive averaging," IEEE Transactions on Speech and Audio Processing, vol. 11, No. 5, pp. 466-475, Sep. 2003.
Cohen, I. and B. Berdugo, "Speech enhancement for non-stationary noise environments," vol. 81, pp. 2403-2418, Jan. 2009.
Lee, Y. S. et al, "Fully complex deep neural network for phase-incorporating monaural source separation," in 2017 IEEE International Conference on Acoustics, Speech and Signal Processing (ICASSP), Mar. 2017, pp. 281-285.
Chen, J. et al. "Large-scale training to increase speech intelligibility for hearing-impaired listeners in novel noises," The Journal of the Acoustical Society of America, vol. 139, No. 5, pp. 2604-2612, 2016.
Xu, Y. et al., "An experimental study on speech enhancement based on deep neural networks," IEEE Signal Processing Letters, vol. 21, No. 1, pp. 65-68, Jan. 2014.
Ochiai, T. et al. Does speech enhancement work with end-to-end ASR objectives?: Experimental analysis of multichannel end-to-end ASR in 2017 IEEE 27th International Workshop on Machine Learning for Signal Processing (MLSP), Sep. 2017, pp. 1-6.
Kolboek, M. et al. "Speech enhancement using long short-term memory based recurrent neural networks for noise robust speaker verification," in 2016 IEEE Spoken Language Technology Workshop (SLT), Dec. 2016, pp. 305-311.
Chinaev, A. et al., "Noise-presence-probability-based noise PSD estimation by using DNNs," in Speech Communication; 12. ITG Symposium, Oct. 2016, pp. 1-5.
Heymann, J. et al., "Neural network based spectral mask estimation for acoustic beamforming," in 2016 IEEE International Conference on Acoustics, Speech and Signal Processing (ICASSP), Mar. 2016, pp. 196-200.
Kupryjanow, A. et al., "Real-time reverb reduction for improved automatic speech recognition in far-field," in 142nd Audio Engineering Society Convention, May 2017.
Iskra, D. et al., "Speecon—speech databases for consumer devices: Database specification and validation," Jun. 2002.
Panayotov, V. et al., "Librispeech: An ASR corpus based on public domain audio books," in 2015 IEEE International Conference on Acoustics, Speech and Signal Processing (ICASSP), Apr. 2015, pp. 5206-5210.
Mesaros, A. et al., "DCASE 2017 challenge setup: Tasks, datasets and baseline system," in Proceedings of the Detection and Classification of Acoustic Scenes and Events 2017 Workshop (DCASE2017), Nov. 2017, pp. 85-92.
Narayanan, A. and D. Wang, "Ideal ratio mask estimation using deep neural networks for robust speech recognition," in 2013 IEEE International Conference on Acoustics, Speech and Signal Processing, May 2013, pp. 7092-7096.
Zaro, R. et al., "Feature learning with raw-waveform CLDNNs for voice activity detection," in Interspeech 2016, 2016.
Dauphin, Y. et al., "RMSProp and equilibrated adaptive learning rates for non-convex optimization," arXiv:1502.04390v1, Feb. 15, 2015, 10 pages.
Nugraha, A. A. et al., Multichannel Audio Source Separation With Deep Neural Network, IEEE/ACM Transactions on Audio, Speech, and Language Processing, vol. 24, No. 9, Sep. 2016.
Sun, L. et al., "Multiple-target deep learning for LSTM-RNN based speech enhancement," 2017 Hands-free Speech Communications and Microphone Arrays (HSCMA), San Francisco, CA, 2017, pp. 136-140.
Li, J. et al., An Overview of Noise-Robust Automatic Speech Recognition, IEEE/ACM Transactions on Audio, Speech, and Language Processing, vol. 22, No. 4, Apr. 2014.
Du, J. et al., "The USTC-iFlytek System for CHiME-4 Challenge", 2016, 3 pages.

\* cited by examiner

NEURAL NETWORK BASED TIME-FREQUENCY MASK ESTIMATION AND BEAMFORMING FOR SPEECH PRE-PROCESSING

CROSS-REFERENCE TO RELATED APPLICATIONS

This application claims the benefit of U.S. Provisional Application No. 62/673,238 filed on May 18, 2018, which is herein incorporated by reference in its entirety.

BACKGROUND

The availability and usage of speech enabled devices is becoming increasingly widespread. Accurate speech recognition and language understanding is important for a satisfactory user experience. Speech signals that are captured in the far-field of a microphone, however, are often not of sufficiently high quality, due to noise and reverberation, to meet the requirements of automatic speech recognition systems and other speech processing applications, which must provide a relatively low word error rate for acceptable performance. Existing far-field speech pre-processing techniques attempt to boost the quality of the received signals but suffer from a number of non-trivial issues including latency, complexity, and the need for a microphone array that includes a relatively large number of microphones. Additionally, many existing techniques rely on voice activity detection which generally does not perform well at low signal-to-noise ratios.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
FIG. 1 is a top-level block diagram of a multi-channel speech processing system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for pre-processing of speech signals captured in the far-field of a microphone, using deep-learning (e.g., neural network) based time-frequency mask estimation and beamforming, to improve or enhance the quality of the speech component of the signal relative to the corrupting noise and reverberation effects which may be present. In an embodiment, the disclosed pre-processing pipeline may serve as a front end for a speech recognition system, or other speech processing applications, to improve the recognition word error rate. Other applications will be apparent.

Audio beamforming is employed to spatially filter out noise from signal, but many if not most devices and platforms, including personal computers, tablets, and smartphones, are generally equipped with only one or two microphones, which limits the effectiveness of traditional beamforming techniques. An embodiment of the present disclosure, however, provides a pre-processing pipeline that uses a trained recurrent neural network (RNN) to estimate time-frequency (TF) masks that distinguish noise from signal, in both time and frequency, which in turn allows for the calculation of beamformer steering vectors with improved performance with relatively few microphones (e.g., one or two), as will be explained in greater detail below, although the pre-processing pipeline will also provide improved performance for arrays with a greater number of microphones as well. In some such embodiments, the pre-processing pipeline also includes de-reverberation and post-filtering operations. Additionally, methods are disclosed for training of the RNN. As will be appreciated in light of this disclosure, the techniques can be used in conjunction with an array of microphones, and the array may include as few as two microphones, according to some embodiments. Other embodiments may operate with a single microphone, employing the TF masks for noise reduction without beamforming, as will be explained below.

Thus, this disclosure provides techniques for pre-processing enhancement of a speech signal, for example to improve the word error rate of downstream processing modules including Automatic Speech Recognition (ASR) engines. The disclosed techniques can be implemented, for example, in a computing system or a software product executable or otherwise controllable by such systems, although other embodiments will be apparent. The system or product is configured to perform pre-processing of far-field speech using deep-learning based time-frequency mask estimation and beamforming. In accordance with an embodiment, a methodology to implement these techniques includes performing de-reverberation processing on signals received from an array of microphones, the signals comprising speech and noise. The method also includes generating TF masks for each of the signals. The TF masks indicate the probability that a time-frequency component of the signal associated with that TF mask element includes speech. The TF mask generation is based on application of a trained recurrent neural network to the signals. The method further includes generating steering vectors based on speech covariance matrices and noise covariance matrices. The TF masks are employed to filter speech components of the signals, for calculation of the speech covariance, and to filter noise components of the signals for calculation of the noise covariance. The method further includes performing beamforming on the signals, based on the steering vectors, to generate the enhanced speech signal by spatially focusing on the source of the speech and reducing the influence of noise and reverberation arriving from other directions.

As will be appreciated, the techniques described herein may allow for an improved user experience with a voice-enabled device by providing an enhanced speech signal to follow-on applications, such as, for example, Automatic Speech Recognition (ASR), keyword spotting, wake-on-voice (WoV), and/or voice over internet protocol (VOIP) communications. The enhanced speech signal results in decreased word error rates among these applications and overall improved operation.

The disclosed techniques can be implemented on a broad range of platforms including laptops, tablets, smart phones, workstations, video conferencing systems, gaming systems, smart home control systems, robotic systems, and low-power embedded DSP/CPU systems or devices. Additionally, in some embodiments, the data may be processed entirely on a local platform or portions of the processing may be offloaded to a remote platform (e.g., employing cloud based processing, or a cloud-based voice-enabled service or application that can be accessed by a user's various local computing systems). These techniques may further be implemented in hardware or software or a combination thereof.

FIG. 1 is a top-level block diagram of a multi-channel speech processing system 100, configured in accordance with certain embodiments of the present disclosure. The system 100 is shown to include a microphone array 110, comprising two or more microphones, configured to capture audio signals. The audio signals may contain speech, noise, and reverberation or other environmental effects, particularly when captured in the far field 105 of the microphone (e.g., greater than a half meter or greater than one meter from the microphone). The microphone array provides a multi-channel input signal 115 to the multi-channel speech pre-processor pipeline 120. Pipeline 120 is configured to generate an enhanced speech signal 145, as will be described in greater detail below, to be provided to any number of speech processing applications 150. These applications may include, for example, an ASR engine 160, a WoV or keyword spotting processor 170, and/or a VOIP communication system 180, to name just a few.

Figure 2:
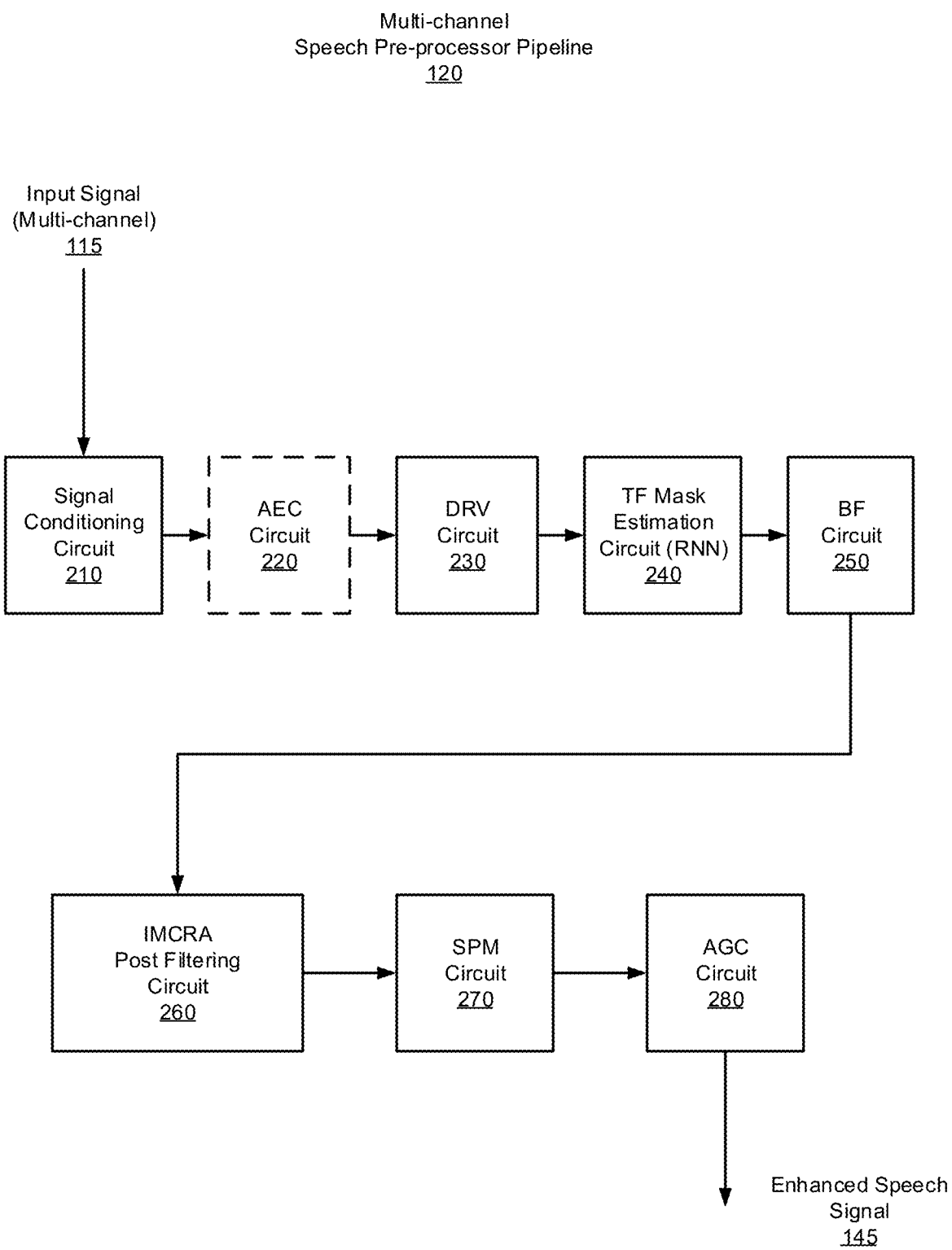
FIG. 2 is a more detailed block diagram of the multi-channel speech pre-processing pipeline, configured in accordance with certain embodiments of the present disclosure.

FIG. 2 is a more detailed block diagram of the multi-channel speech pre-processing pipeline 120, configured in accordance with certain embodiments of the present disclosure. The multi-channel speech pre-processing pipeline 120 is shown to include a signal conditioning circuit 210, an acoustic echo cancellation (AEC) circuit 220, a de-reverberation (DRV) circuit 230, a time-frequency mask estimation circuit 240, a beamforming circuit 250, an Improved Minima Controlled Recursive Averaging (IMCRA) post filtering circuit 260, a spectral profile matching (SPM) circuit 270, and an automatic gain control (AGC) circuit 280. The TF mask estimation circuit 240 is implemented as a recursive neural network (RNN).

The signal conditioning circuit 210 is configured to perform any needed gain adjustments and removal of DC bias that may be present in the multi-channel signals 115. These adjustments prepare the signals for subsequent operations in the pre-processing pipeline. The optional AEC circuit 220, is configured to perform a first pass at removal or reduction of echoes in the signal using known echo cancellation techniques, in light of the present disclosure. The DRV circuit 230 is configured to perform a de-reverberation operation on the signals, also using known techniques in light of the present disclosure, to improve the accuracy of the TF mask estimation which follows.

Figure 6:
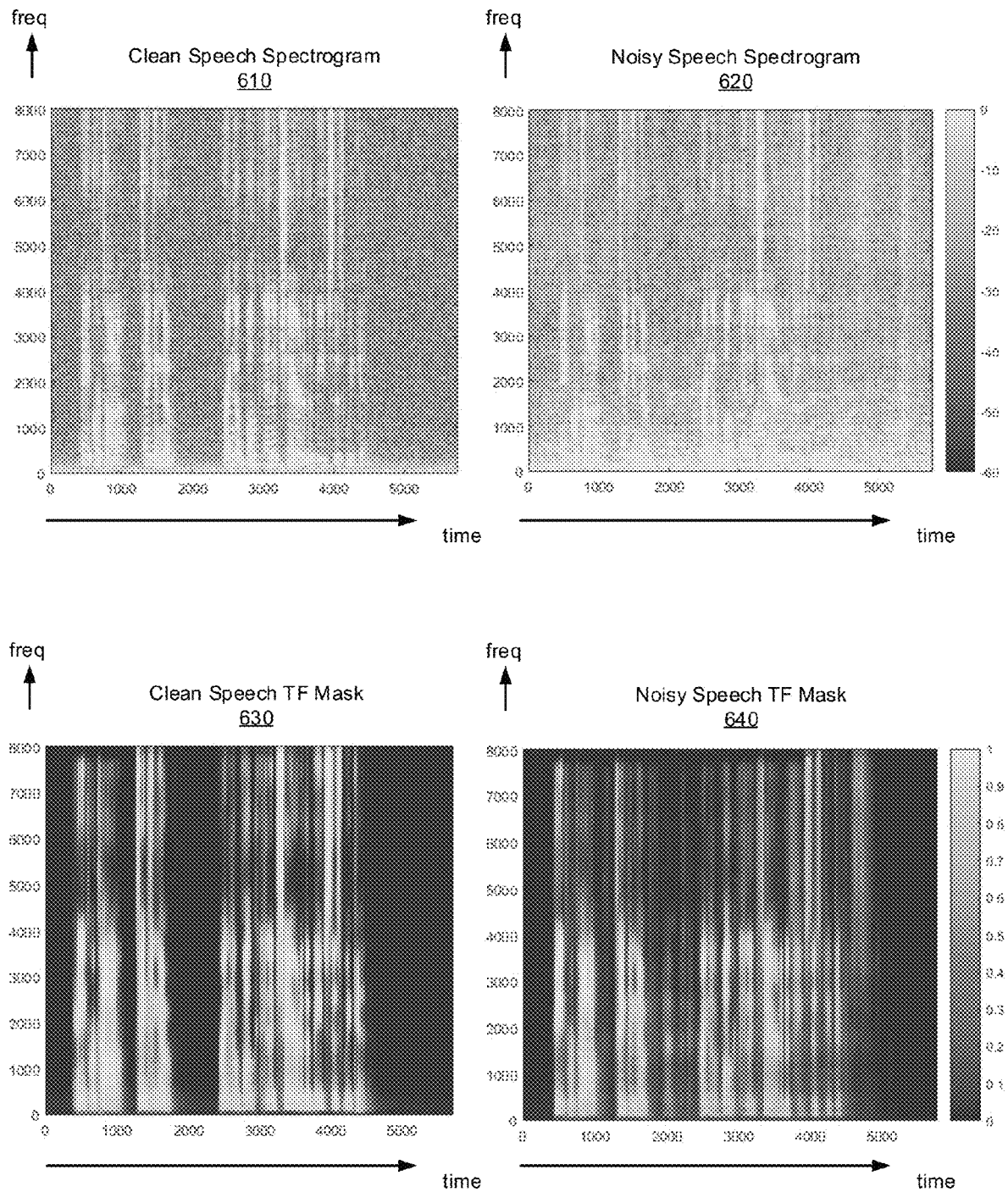
FIG. 6 illustrates speech spectrograms and associated TF masks, in accordance with certain embodiments of the present disclosure.

The TF mask estimation circuit (RNN) 240 is configured to generate an estimated time-frequency mask for each of the DRV processed signals. The TF mask is a 2-dimensional data structure (dimensions being time and frequency), comprising elements that correspond to time slots and frequency bins, in the manner of a spectrogram. FIG. 6 illustrates speech spectrograms and associated TF masks, in accordance with certain embodiments of the present disclosure. A spectrogram of a sample of clean speech 610 is shown along with the resulting TF mask 630. The power levels of each element in the spectrogram are color coded with yellow representing the highest level at 0 dB, down through the lowest level coded as blue at −60 dB. The values in the TF mask, which represent the estimated probability of speech being present at that corresponding time and frequency, are also color coded with yellow representing a normalized probability of 1 down to blue representing a normalized probability of 0. Thus, a value of 1 indicates that the component is recognized as speech, while value of 0 indicates that the component is recognized as noise. As can be seen, there is a strong correlation between the clean speech spectrogram and the resulting estimated TF mask. Another spectrogram of a sample of noisy speech 620 is shown along with the resulting TF mask 640. In this case, the spectrogram 620 shows significant energy over a broader range of time and frequency bins due to added noise. The noisy speech TF mask 640, however, remains relatively similar to the clean speech TF mask 630 and provides guidance as to where, in time and frequency, the speech signal is likely to be present.

Figure 5:
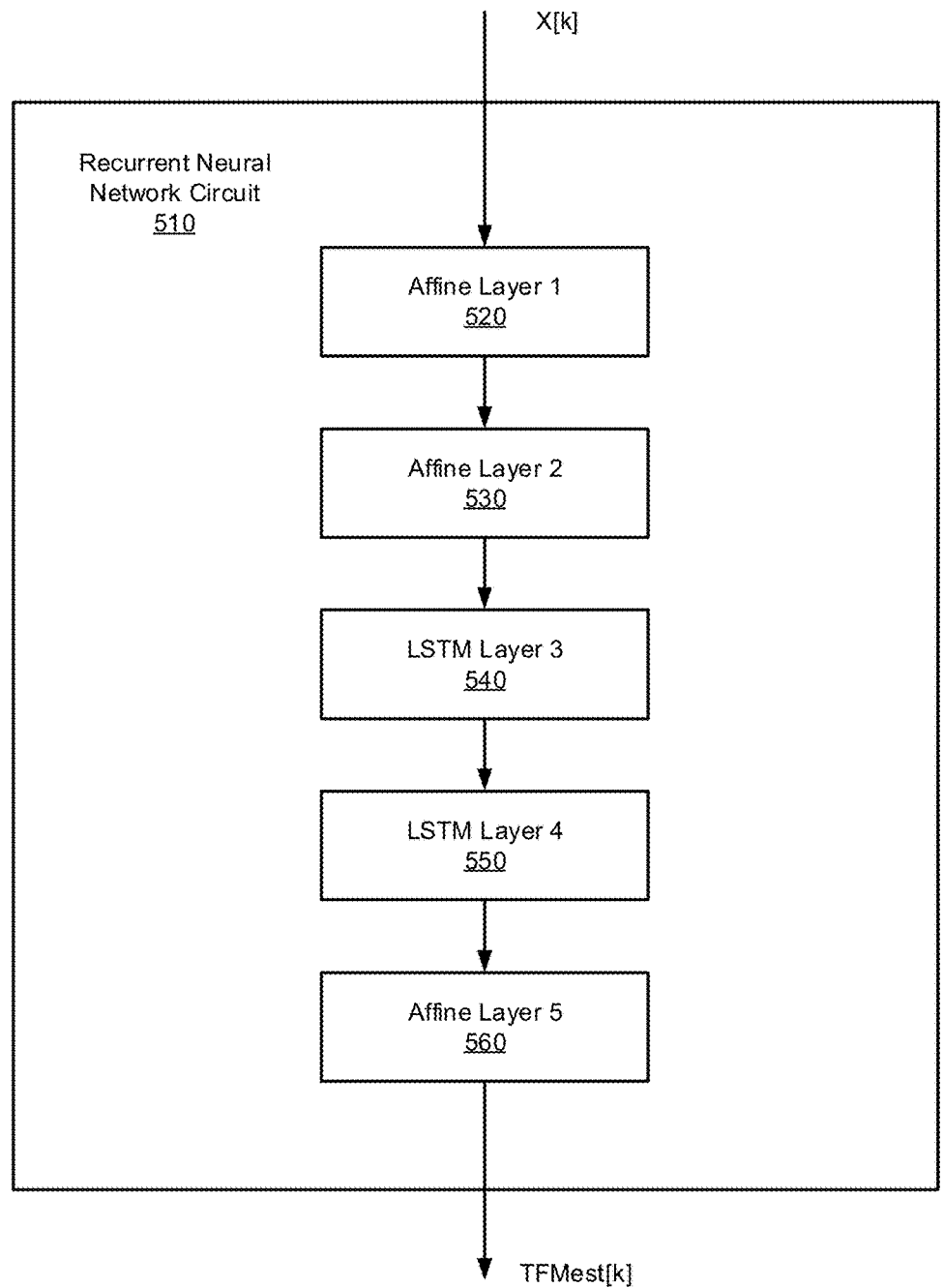
FIG. 5 is a block diagram of a time-frequency (TF) mask estimation circuit, configured in accordance with certain embodiments of the present disclosure.

An estimated TF mask is generated for each channel of the signal by a trained RNN which operates on the received signals. The training process is described in greater detail below. FIG. 5 illustrates a block diagram of the time-frequency mask estimation circuit 240, configured in accordance with certain embodiments of the present disclosure. The RNN circuit 510 is shown to comprise 5 layers. The first layer 520 and the second layer 530 are affine (fully connected) layers with hyperbolic tangent activation functions. The third layer 540 and the fourth layer 550 are Long Short-Term Memory (LSTM) layers with sigmoid activation functions. The fifth layer 560 is an affine layer with a sigmoid activation function. In some embodiments, layers 1, 2, and 5 may have 256 nodes each while layers 3 and 4 may have 128 nodes each. It will be appreciated that other configurations are possible with differing numbers and types of layers, activation functions and node counts. In general, however, the RNN will include at least one recurrent layer to provide a history or memory of previous data to model temporal dependencies, without the need for actual storage of past data.

Referring back now to FIG. 2, the beamforming circuit 250 is configured to generate steering vectors based on speech covariance matrices and noise covariance matrices.

The TF masks, previously estimated, are employed to filter speech components of the DRV processed signals for calculation of the speech covariance matrices, and to filter noise components of the DRV processed signals for calculation of the noise covariance matrices. For example, the noise covariance matrix $\Phi_{NN}$ may be calculated/updated based on application of the TF mask as:

$$\Phi_{NN}(k,t+1) = \alpha \cdot \Phi_{NN}(k,t) + (1-\alpha) \cdot ((1-\text{TFM}(k,t)) \cdot X^*(k,t) \cdot X(k,t))$$

where X is the complex spectrum of the captured signal for frequency bin k, and α is a selected memory decay factor. The t and k parameters specify the time slot and frequency bin of each element. Similarly, the speech covariance matrix $\Phi_{SS}$ may be calculated/updated based on application of the TF mask as:

$$\Phi_{XX}(k,t+1) = \alpha \cdot \Phi_{XX}(k,t) + (1-\alpha) \cdot (\text{TF}(k,t) \cdot X^*(k,t) \cdot X(k,t))$$
$$\Phi_{SS}(k,t+1) = \Phi_{XX}(k,t+1) - \Phi_{NN}(k,t+1)$$

In some embodiments, the magnitude of the spectrum may be used instead of the full complex spectrum, to simplify and reduce the computational burden of the calculations.

The beamforming circuit is further configured to perform beamforming on the DRV processed signals, based on the steering vectors, to generate a single channel speech signal which is steered to the source of the speech. In some embodiments, the beamforming employs Generalized Eigenvalue beamforming with Blind Analytical Normalization. The steering vectors, or beamformer weights, W(k) may be calculated as the maximum eigenvector corresponding to the largest eigenvalue of $\Phi_{NN}^{-1}(k)\Phi_{SS}(k)$. The beamformer output may then be calculated as:

$$Y(k) = \sum_{i=1}^{M} W_i^*(k) \cdot X_i(k) = \sum_{i=1}^{M} W_i^*(k) \cdot (S_i(k) + N_i(k))$$

where M is the number of channels of the input signal (e.g., the number of microphones in the array 110).

The IMCRA post filtering circuit 260 is configured to perform Improved Minima Controlled Recursive Averaging to reduce stationary noise components of the single channel speech signal, using known techniques in light of the present disclosure.

The SPM circuit 270 is configured to perform spectral shaping on the IMCRA-filtered single channel speech signal based on heuristics associated with a selected ASR engine. Different ASR engines provided by various vendors are often tuned to work best with signals that are spectrally shaped in a particular manner. For example, a given ASR engine may expect the input speech signal to be filtered with a high frequency cut off at 6 kHz.

The AGC circuit 280 is configured to perform any final gain control to scale the enhanced speech signal 145 into an appropriate amplitude range based on the requirements of the follow-on speech processing applications.

Figure 3:
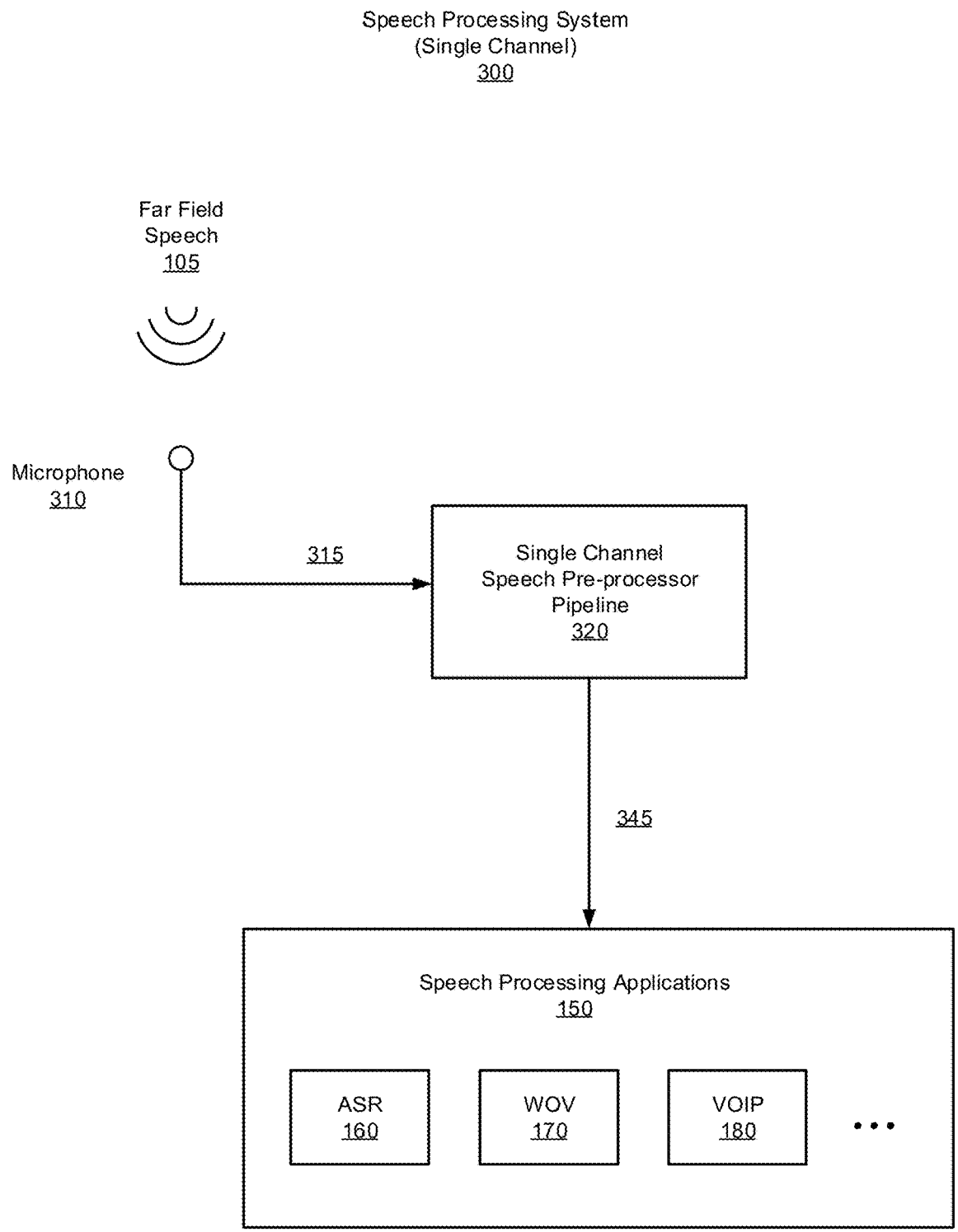
FIG. 3 is a top-level block diagram of a single channel speech processing system, configured in accordance with certain other embodiments of the present disclosure.

FIG. 3 is a top-level block diagram of a single channel speech processing system 300, configured in accordance with certain other embodiments of the present disclosure. The system 300 is shown to include a single microphone 310, configured to capture audio signals. The audio signals may contain speech, noise, and reverberation or other environmental effects, particularly when captured in the far field 105 of the microphone (e.g., greater than a half meter or one meter from the microphone). The microphone provides a single channel input signal 315 to the single channel speech pre-processor pipeline 320, which is configured to generate an enhanced speech signal 345, as will be described in greater detail below, to be provided to the speech processing applications 150.

Figure 4:
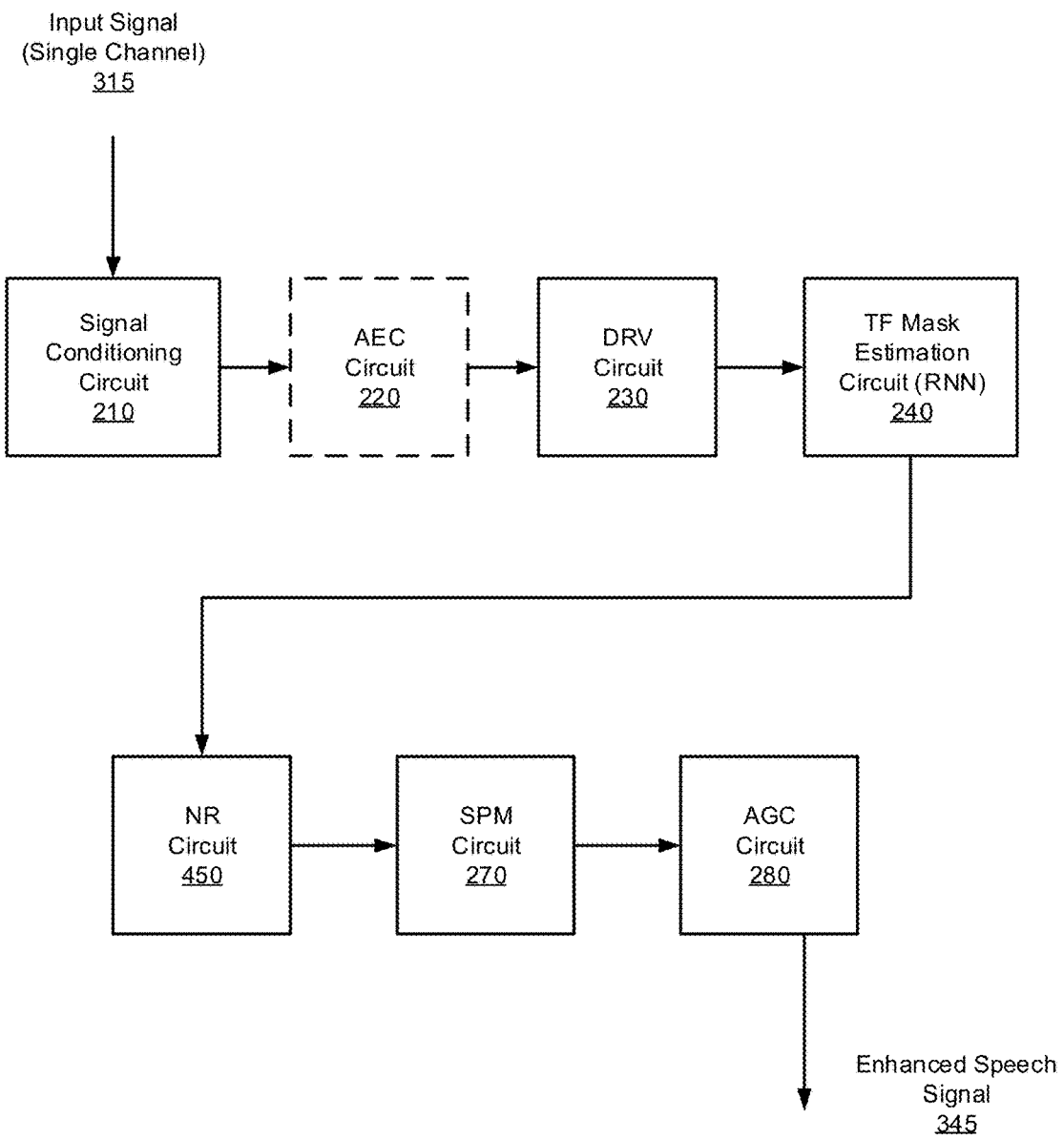
FIG. 4 is a more detailed block diagram of the single channel speech pre-processing pipeline, configured in accordance with certain other embodiments of the present disclosure.

FIG. 4 is a more detailed block diagram of the single channel speech pre-processing pipeline 320, configured in accordance with certain other embodiments of the present disclosure. The single channel speech pre-processing pipeline 320 is shown to include a signal conditioning circuit 210, an acoustic echo cancellation (AEC) circuit 220, a de-reverberation (DRV) circuit 230, a time-frequency mask estimation circuit 240, a noise reduction circuit 450, a spectral profile matching (SPM) circuit 270, and an automatic gain control (AGC) circuit 280. The TF mask estimation circuit 240 is implemented as a recursive neural network (RNN).

The signal conditioning circuit 210, AEC circuit 220, DRV circuit 230, and TF mask estimation circuit (RNN) 240 are configured to perform the functions as previously described with respect to the multi-channel pipeline 120, however they are performed on the single available channel.

In place of the beamforming circuit 250 of the multi-channel pre-processing pipeline 120, the noise reduction circuit 450 of the single channel pre-processing pipeline is configured to apply the TF mask directly to the spectrum of the captured signal. This can be expressed by the following formula:

$$Y(t,k) = \text{TFM}(t,k) \cdot X(t,k)$$

where X is the complex spectrum of the captured signal (e.g., the signal represented in the frequency domain), TFM is the time-frequency mask, and Y is the complex spectrum of the enhanced signal after noise reduction. The t and k parameters specify the time slot and frequency bin of each element. In some embodiments, the complex spectrum can be converted to magnitude and phase components, and the modification (e.g., application of mask) may be performed on just the magnitude spectrum to simplify and reduce the computational burden of the calculations.

In some embodiments, noise reduction circuit 450 may also be configured to perform additional signal processing operations on the TF mask, such as, for example, the application of a moving average to smooth the mask, and thresholding to limit mask values to a desired range. For example, the mask may be set to zero where the input signal is below a selected threshold. In some embodiments, the mask may be clipped to a selected interval (e.g., [0,1]). In a recurrent neural network, this may be accomplished implicitly through the use of a sigmoid activation function. In some further embodiments, a weighted sum of the original and processed spectrum may be used to control the degree of noise reduction. This can be expressed, for example, by the following formula:

$$Y(t,k) = (w_X + w_{TF} \cdot \text{TFM}(t,k)) \cdot X(t,k)$$

where $w_X$ and $w_{TF}$ are selected weighting factors.

The SPM circuit 270 and AGC circuit 280 are configured to perform the functions as previously described with respect to the multi-channel pipeline 120.

Figure 7:
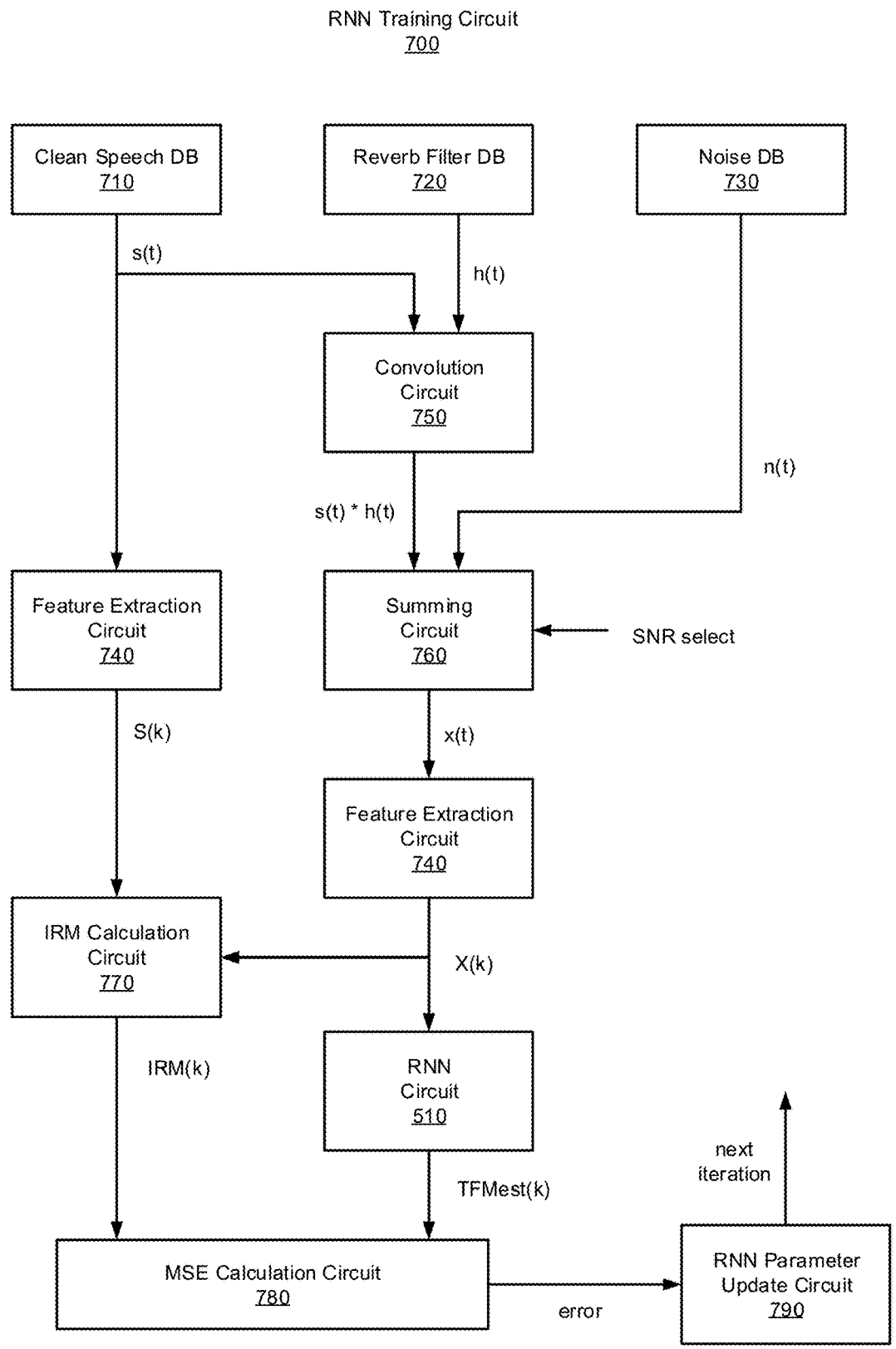
FIG. 7 is a block diagram of an RNN training circuit, configured in accordance with certain embodiments of the present disclosure.

FIG. 7 is a block diagram of an RNN training circuit 700, configured in accordance with certain embodiments of the present disclosure. The RNN training circuit 700 is shown to include a convolution circuit 750, a feature extraction circuit 740, a summing circuit 760, an ideal ratio mask (IRM) calculation circuit 770, RNN circuit 510, mean squared error (MSE) calculation circuit 780, and RNN parameter update circuit 790. Also shown are databases for clean speech samples 710, reverberation filters 720, and noise samples 730.

For each training iteration, a clean speech signal sample s(t) is selected from database 710, a reverberation filter h(t) is selected from database 720, and a noise signal sample n(t) is selected from database 730. The reverberation filter models the acoustic echoes or reflections associated with an environment (e.g., rooms of various sizes and geometries), which may corrupt a signal captured from the far field of the microphones. The noise samples may include any type of interfering noise including white noise, colored noise, and Babble noise (e.g., snippets of background speech or music). Convolution circuit 750 is configured to apply the reverberation filter to the clean speech signal sample to generate s(t)*h(t), where * represents the convolution operator. Summing circuit 760 is configured to add in the noise signal sample, after application of a gain factor g, selected to achieve a desired signal-to-noise ratio (SNR), resulting in x(t)=s(t)*h(t)+g n(t). Feature extraction circuit 740 is configured to generate a frequency domain feature representation X(k) of the noisy signal x(t). In some embodiments, X(k) may represent extracted feature vectors of the noisy signal, a raw waveform of the noisy signal, or spectral coefficients of the noisy waveform. The frequency domain feature representation X(k) of the noisy signal is provided to the RNN circuit 510 to be trained, and an estimated TF mask is generated for this iteration.

Feature extraction circuit 740 is also configured to generate a frequency domain feature representation S(k) of the clean speech signal s(t). IRM calculation circuit 770 is configured to generate an ideal ratio mask as a training target for the RNN, for example, IRM(k)=S(k)/X(k). This process enables the noisy speech X to be precisely aligned with the clean speech S, which allows for improved training of the neural network. In some embodiments, an ideal binary mask may be employed as an alternative to the IRM. In some embodiments, further processing may be performed on the IRM, including, for example, smoothing and thresholding operations as previously described in connection with the calculation of the TF mask.

MSE calculation circuit 780 is configured to compute the mean squared error (or any other desired error measurement) between the IRM and the estimated TF mask. The RNN parameter update circuit 790 is configured to update the parameters for training of the neural network, for this iteration, based on the error, using known techniques in light of the present disclosure.

The availability of a large body of clean speech samples and a database of impulse responses and noise recordings, allows for the creation of a training data set with a large number of utterances and a great deal of variation in the type of disturbances. This results in a more robust neural network which is able to correctly infer the TF mask under challenging noise conditions and far field conditions.

Figure 8:
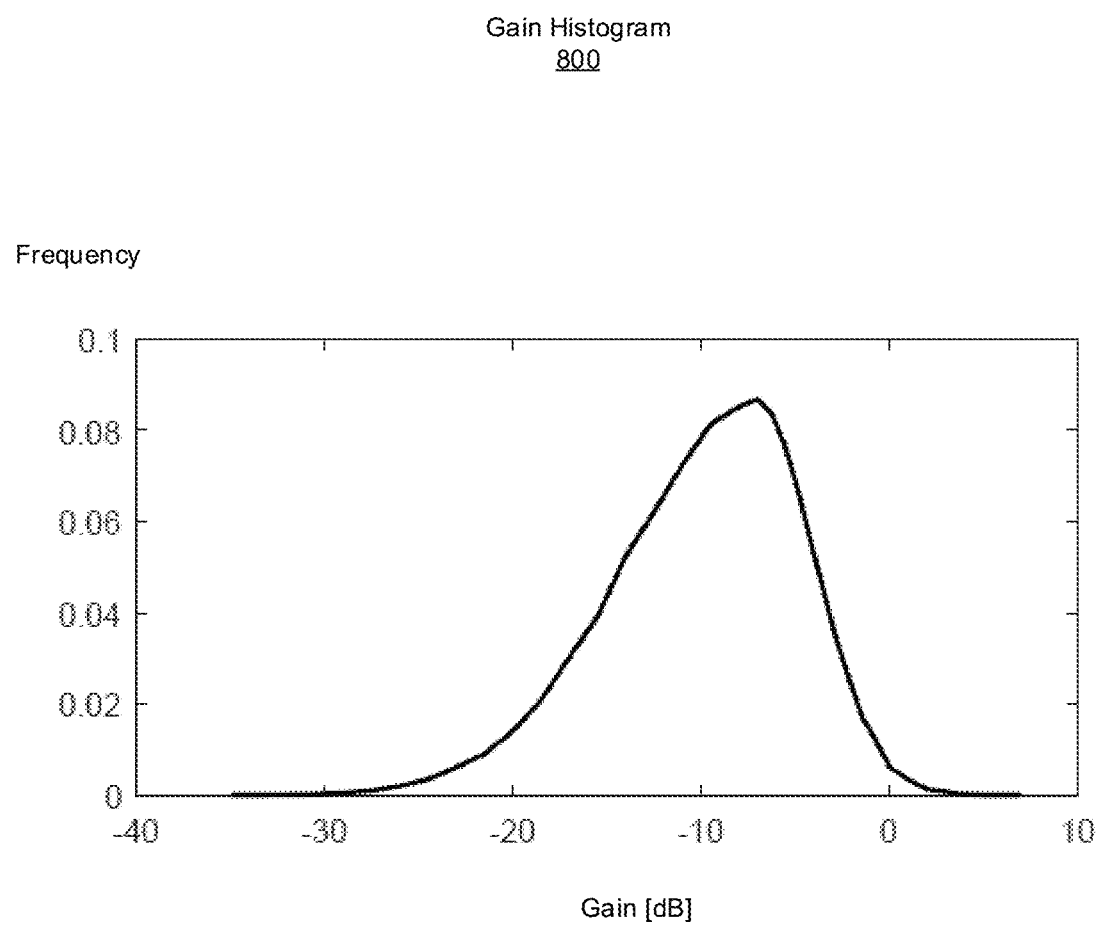
FIG. 8 illustrates a histogram of gain factors, in accordance with certain embodiments of the present disclosure.

FIG. 8 illustrates a histogram 800 of gain factors, in accordance with certain embodiments of the present disclosure. Due to the fact that clean speech signals in the database 710 are typically recorded at higher levels than the signals captured by the microphones in the target device, the training of the TF mask estimator may develop a dependency on the input gain. To counteract this effect, in some embodiments, an additional random gain factor may be selected from the histogram 800 and applied to the training signal X(k) for the RNN circuit 510. The histogram 800 is shown to be asymmetric with a mean value of −7 dB, although other distributions are possible.

Figure 9:
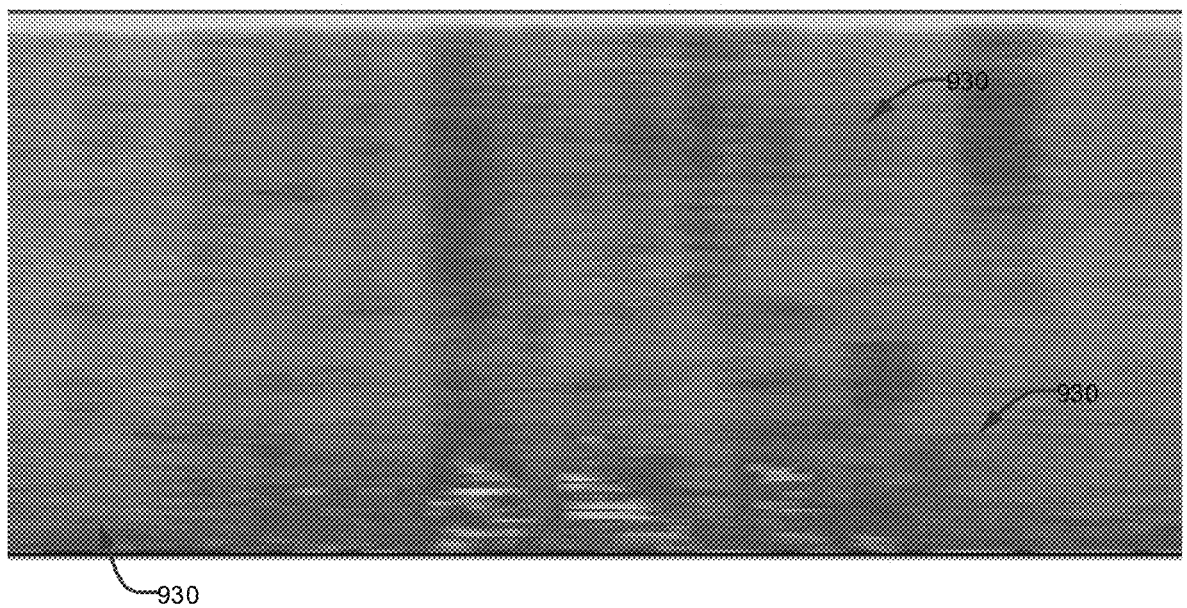
FIG. 9 illustrates results of speech pre-processing, in accordance with certain embodiments of the present disclosure.
Figure 9:
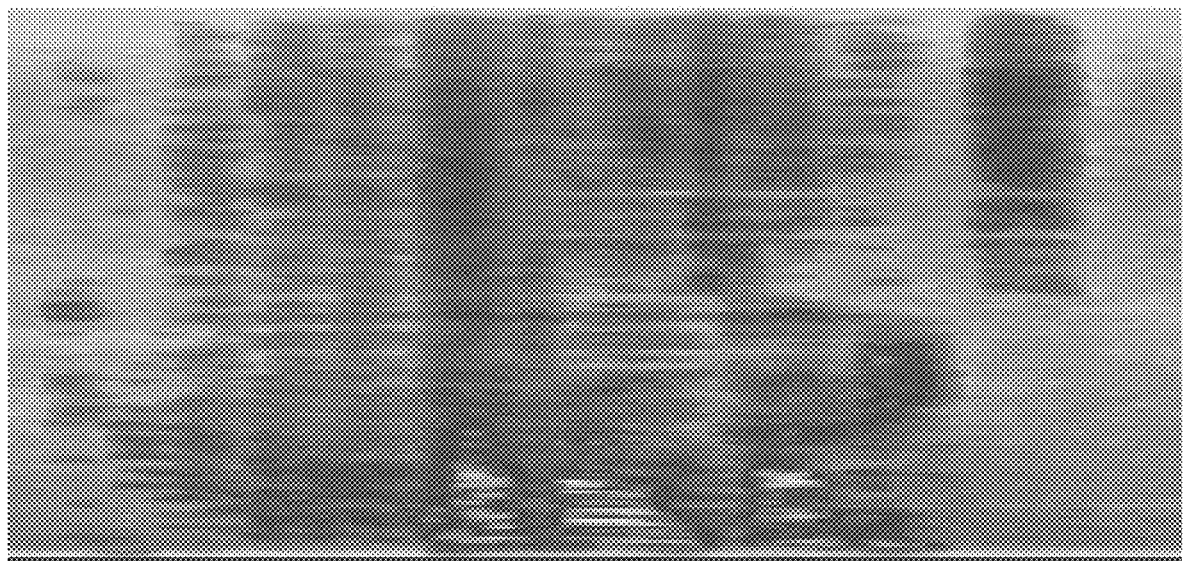

FIG. 9 illustrates results of speech pre-processing, in accordance with certain embodiments of the present disclosure. A spectrogram of the input signal 910 is shown alongside a spectrogram of the pre-processing pipeline enhanced signal 920, using a 2-microphone array. As can be seen, the pre-processing results in an improvement in reduction of the noise, some examples of which are indicated by reference number 930.

Methodology

Figure 10:
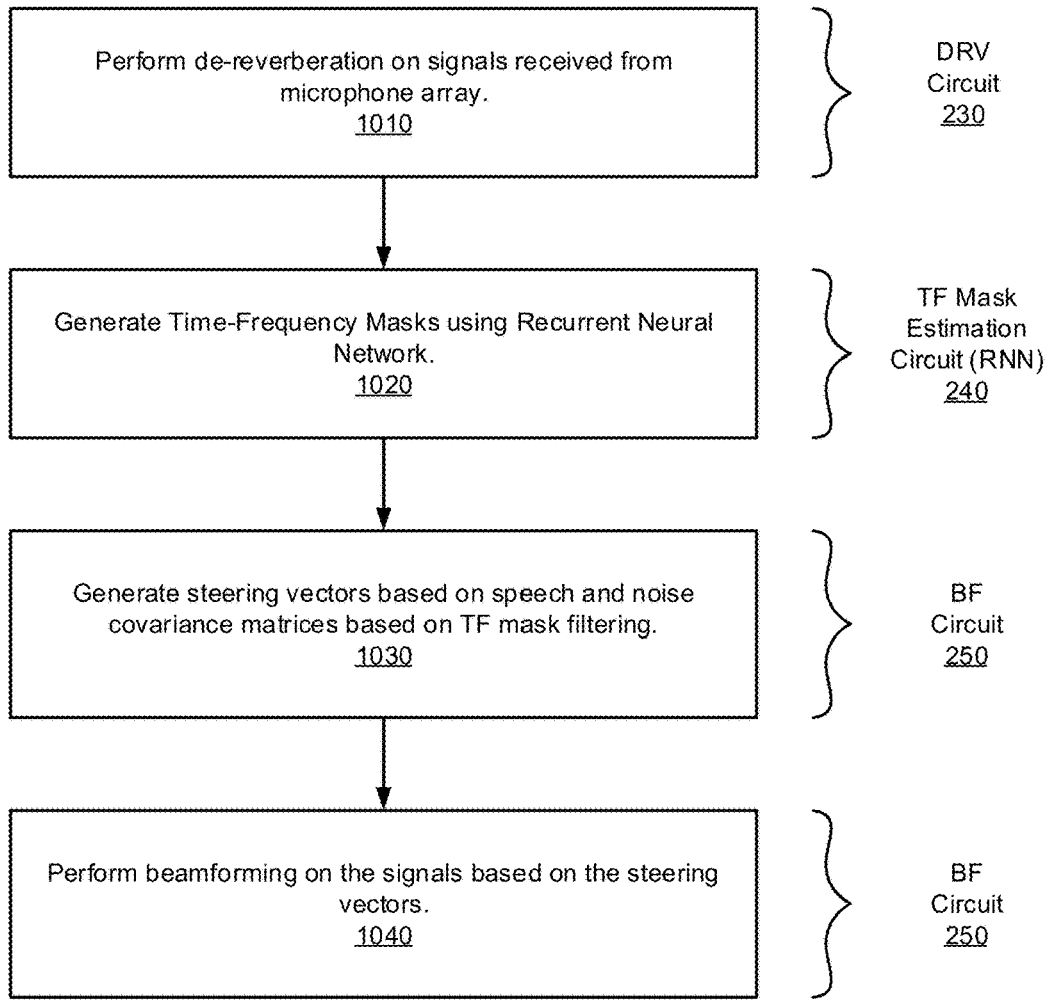
FIG. 10 is a flowchart illustrating a methodology for speech pre-processing, in accordance with certain embodiments of the present disclosure.

FIG. 10 is a flowchart illustrating an example method 1000 for pre-processing of far-field speech using deep-learning based time-frequency mask estimation and beam-forming, in accordance with certain embodiments of the present disclosure. As can be seen, the example method includes a number of phases and sub-processes, the sequence of which may vary from one embodiment to another. However, when considered in the aggregate, these phases and sub-processes form a process for speech pre-processing, in accordance with certain of the embodiments disclosed herein. These embodiments can be implemented, for example, using the system architecture illustrated in FIGS. 1-5, and 7, as described above. However other system architectures can be used in other embodiments, as will be apparent in light of this disclosure. To this end, the correlation of the various functions shown in FIG. 10 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 1000. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 10, in an embodiment, method 1000 for speech signal pre-processing commences by performing, at operation 1010, de-reverberation (DRV) processing on each of a plurality of signals received from an array of microphones. The signals, which include a combination of speech and noise, may be obtained from the far-field of the microphones (e.g., greater than one meter from the microphones). The DRV process removes or reduces far-field environmental effects such as reverberation prior to and to improve the performance of the subsequent pre-processing operations.

Next, at operation 1020, a plurality of time-frequency masks are generated. Each of the TF masks is associated with one of the DRV processed signals. The TF masks are 2-dimensional and comprise elements corresponding to time and frequency bins. Each TF mask element indicates a probability that the time-frequency component of the DRV processed signal associated with that element includes speech. The TF mask generation is based on application of a trained recurrent neural network (RNN) to the DRV processed signals.

In some embodiments, the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

At operation 1030, beamforming steering vectors are generated, based on speech covariance matrices and noise covariance matrices of the DRV processed signals. The TF masks are employed to filter speech components of the DRV processed signals for calculation of the speech covariance matrices, and to filter noise components of the DRV processed signals for calculation of the noise covariance matrices.

At operation 1040, beamforming is performed on the plurality of DRV processed signals, based on the steering vectors, to generate an enhanced single channel speech signal. In some embodiments, the beamforming employs Generalized Eigenvalue beamforming with Blind Analytical Normalization.

Of course, in some embodiments, additional operations may be performed, as previously described in connection with the system. For example, Improved Minima Controlled Recursive Averaging (IMCRA) may be performed to reduce stationary noise components of the single channel speech signal generated by the beamformed. In some embodiments, the enhanced single channel speech signal is provided to a speech processing application such as, for example, an Automatic Speech Recognition (ASR) engine, a keyword spotting application, a wake-on-voice (WoV) application, and/or a voice over internet protocol (VOIP) application.

Example System

Figure 11:
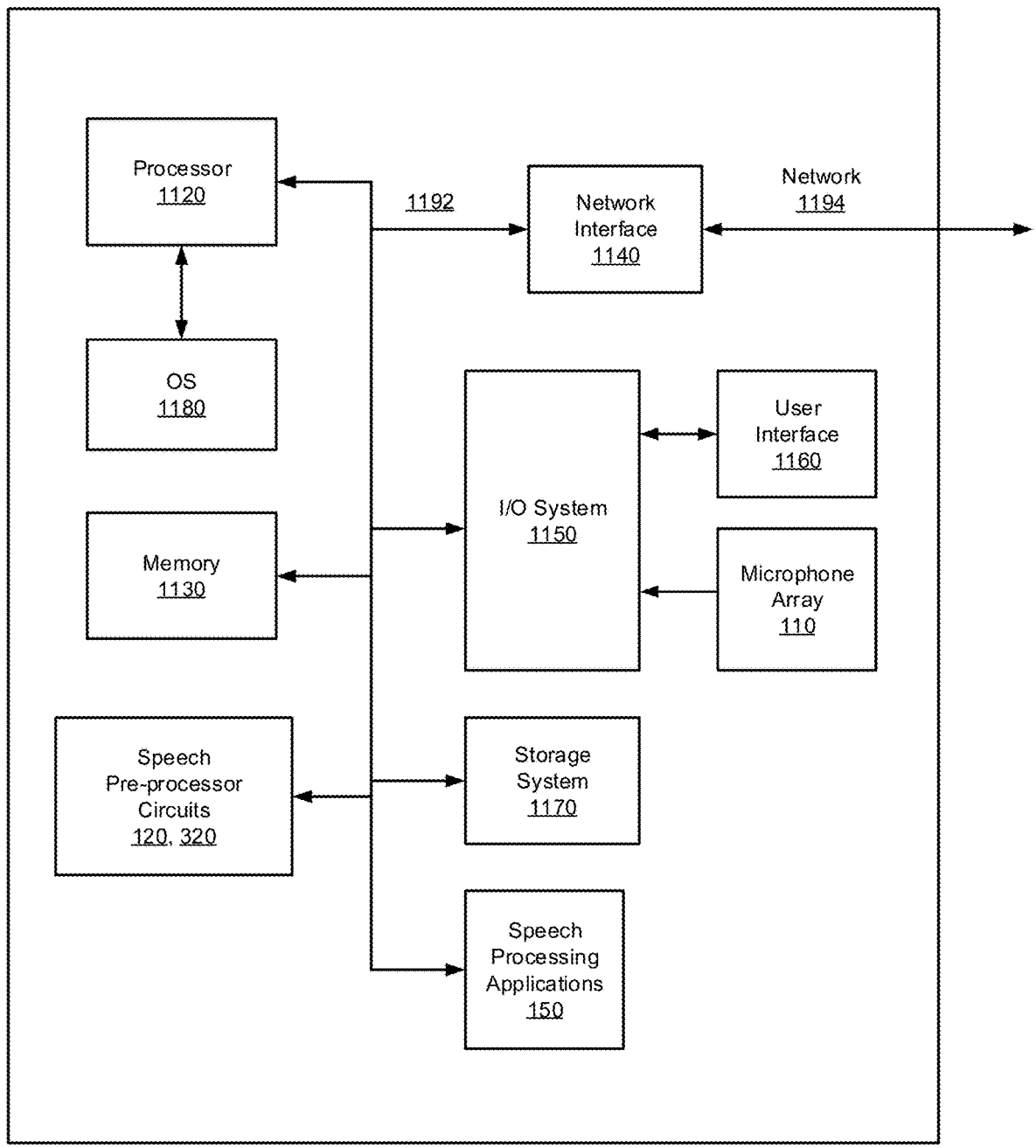
FIG. 11 is a block diagram schematically illustrating a voice-enabled device platform configured to perform speech pre-processing, in accordance with certain embodiments of the present disclosure.

FIG. 11 illustrates an example voice-enabled device platform 1100, configured in accordance with certain embodiments of the present disclosure, to perform speech pre-processing for enhancement of the speech signal prior to use by a speech processing application. In some embodiments, platform 1100 may be hosted on, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, wearable device, embedded system, and so forth. Any combination of different devices may be used in certain embodiments.

In some embodiments, platform 1100 may comprise any combination of a processor 1120, a memory 1130, speech pre-processor circuits 120 and/or 320, speech processing applications 160, 170, 180, a network interface 1140, an input/output (I/O) system 1150, a user interface 1160, a microphone array 110, and a storage system 1170. As can be further seen, a bus and/or interconnect 1192 is also provided to allow for communication between the various components listed above and/or other components not shown. Platform 1100 can be coupled to a network 1194 through network interface 1140 to allow for communications with other computing devices, platforms, devices to be controlled, or other resources. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor, a graphics processing unit, or hardware accelerator, to assist in control and processing operations associated with platform 1100. In some embodiments, the processor 1120 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random-access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1100, and therefore may also be implemented using any suitable existing or subsequently-developed platform.

Network interface circuit 1140 can be any appropriate network chip or chipset which allows for wired and/or wireless connection between other components of device platform 1100 and/or network 1194, thereby enabling platform 1100 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of device platform 1100. I/O devices may include, but not be limited to, user interface 1160 and microphone array 110. User interface 1160 may include devices (not shown) such as a speaker, display element, touchpad, keyboard, and mouse, etc. I/O system 1150 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1120 or any chipset of platform 1100.

It will be appreciated that in some embodiments, the various components of platform 1100 may be combined or integrated in a system-on-a-chip (SoC) architecture. In some embodiments, the components may be hardware components, firmware components, software components or any suitable combination of hardware, firmware or software.

Speech pre-processor circuits 120, 320 are configured to enhance the quality of a received speech signal through TF mask based beamforming (in the case of a microphone array) or TF mask based noise reduction (in the case of a single microphone), as described previously. Speech pre-processor circuits 120, 320 may include any or all of the circuits/components illustrated in FIGS. 1-5 and 7, as described above. These components can be implemented or otherwise used in conjunction with a variety of suitable software and/or hardware that is coupled to or that otherwise forms a part of platform 1100. These components can additionally or alternatively be implemented or otherwise used in conjunction with user I/O devices that are capable of providing information to, and receiving information and commands from, a user.

In some embodiments, these circuits may be installed local to platform 1100, as shown in the example embodiment of FIG. 11. Alternatively, platform 1100 can be implemented in a client-server arrangement wherein at least some functionality associated with these circuits is provided to platform 1100 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 1194 or remotely coupled to network 1194 by one or more other networks and/or communication channels. In some cases, access to resources on a given network or computing system may require credentials such as usernames, passwords, and/or compliance with any other suitable security mechanism.

In various embodiments, platform 1100 may be implemented as a wireless system, a wired system, or a combination of both. When implemented as a wireless system, platform 1100 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the speech pre-processing methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1194. In other embodiments, the functionalities disclosed herein can be incorporated into other voice-enabled devices and speech-based software applications, such as, for example, automobile control/navigation, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1100 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is at least one non-transitory computer readable storage medium having instructions encoded thereon that, when executed by one or more processors, cause a process to be carried out for enhancement of a speech signal, the process comprising: performing de-reverberation (DRV) processing on first and second signals received from first and second microphones, respectively, the first and second signals each comprising a combination of speech and noise; generating first and second time-frequency masks (TFMs), each of the first and second TFMs associated with a corresponding one of the DRV processed first and second signals, each of the first and second TFMs comprising elements indicating a probability that a time-frequency component of the DRV processed signal associated with that TFM element includes speech, wherein the TFM generation is based on application of a recurrent neural network (RNN) to the DRV processed first and second signals; generating steering vectors based on speech covariance matrices and noise covariance matrices, the first and second TFMs employed to filter speech components of the DRV processed first and second signals, respectively, for calculation of the speech covariance matrices, and to filter noise components of the DRV processed first and second signals for calculation of the noise covariance matrices; and performing beamforming on the DRV processed first and second signals, based on the steering vectors, to generate a single channel speech signal.

Example 2 includes the subject matter of Example 1, the process further comprising performing Improved Minima Controlled Recursive Averaging to reduce stationary noise components of the single channel speech signal.

Example 3 includes the subject matter of Examples 1 or 2, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 4 includes the subject matter of any of Examples 1-3, wherein the beamforming employs Generalized Eigenvalue beamforming with Blind Analytical Normalization.

Example 5 includes the subject matter of any of Examples 1-4, wherein the first and second signals are received from a far-field of the first and second microphones.

Example 6 includes the subject matter of any of Examples 1-5, the process further comprising providing the single channel speech signal to at least one of an Automatic Speech Recognition (ASR) engine, a keyword spotting application, a wake-on-voice (WoV) application, and a voice over internet protocol (VOIP) application.

Example 7 is a system for pre-processing of a speech signal, the system comprising: a de-reverberation (DRV) circuit to perform DRV processing on a plurality of signals received from an array of microphones, the signals comprising a combination of speech and noise; a time-frequency mask (TFM) estimation circuit to generate a plurality of TFMs, each of the TFMs associated with one of the DRV processed signals, the TFMs comprising elements indicating a probability that a time-frequency component of the DRV processed signal associated with that TFM element includes speech, wherein the TFM generation is based on application of a recurrent neural network (RNN) to the DRV processed signals; a beamforming circuit to generate steering vectors based on speech covariance matrices and noise covariance matrices, the TFMs employed to filter speech components of the DRV processed signals for calculation of the speech covariance matrices, and to filter noise components of the DRV processed signals for calculation of the noise covariance matrices; and the beamforming circuit further to perform beamforming on the plurality of DRV processed signals, based on the steering vectors, to generate a single channel speech signal.

Example 8 includes the subject matter of Example 7, further comprising a post filtering circuit to perform Improved Minima Controlled Recursive Averaging to reduce stationary noise components of the single channel speech signal.

Example 9 includes the subject matter of Example 7 or 8, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 10 includes the subject matter of any of Examples 7-9, wherein the beamforming employs Generalized Eigenvalue beamforming with Blind Analytical Normalization.

Example 11 includes the subject matter of any of Examples 7-10, wherein the plurality of received signals are received from a far-field of the microphones.

Example 12 includes the subject matter of any of Examples 7-11, wherein the single channel speech signal is provided to at least one of an Automatic Speech Recognition (ASR) engine, a keyword spotting application, a wake-on-voice (WoV) application, and a voice over internet protocol (VOIP) application.

Example 13 is at least one non-transitory computer readable storage medium having instructions encoded thereon that, when executed by one or more processors, cause a process to be carried out for enhancement of a speech signal, the process comprising: performing de-reverberation (DRV) processing on a signal received from a microphone, the signal comprising a combination of speech and noise; generating a time-frequency mask (TFM) associated with the DRV processed signal, the TFM comprising elements indicating a probability that a time-frequency component of the DRV processed signal associated with that TFM element includes speech, wherein the TFM generation is based on application of a recurrent neural network (RNN) to the DRV processed signal; and performing noise reduction on the DRV processed signal to generate an enhanced speech signal, the noise reduction employing the TFM to identify noise to be filtered.

Example 14 includes the subject matter of Example 13, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 15 includes the subject matter of Examples 13 or 14, wherein the received signal is received from a far-field of the microphone.

Example 16 includes the subject matter of any of Examples 13-15, the process further comprising providing the enhanced speech signal to at least one of an Automatic Speech Recognition (ASR) engine, a keyword spotting application, a wake-on-voice (WoV) application, and a voice over internet protocol (VOIP) application.

Example 17 is a processor-implemented method for training a recursive neural network (RNN) to generate a time-frequency mask (TFM), the method comprising: selecting, by a processor-based system, a sample clean-speech signal from a speech database; selecting, by the processor-based system, a reverberation filter from a filter database; selecting, by the processor-based system, a sample noise-signal from a noise database; scaling, by the processor-based system, the sample noise-signal based on a selected signal to noise ratio (SNR); applying, by the processor-based system, the reverberation filter to the sample clean-speech signal, and adding the scaled sample noise-signal to the result of the reverberation filter application, to generate a noisy-speech signal; generating, by the processor-based system, an estimated TFM based on application of the RNN to features extracted from the noisy-speech signal; generating, by the processor-based system, a target TFM based on a ratio of features extracted from the sample clean-speech signal to the features extracted from the noisy-speech signal; and training, by the processor-based system, the RNN based on a calculated error between the estimated TFM and the target TFM.

Example 18 includes the subject matter of Example 17, further comprising iterating the method for training the RNN to generate the TFM based on additional selections of the sample clean-speech signal, the reverberation filter, the sample noise-signal, and the SNR.

Example 19 includes the subject matter of Examples 17 or 18, wherein the reverberation filter is to simulate far-field environmental effects on a signal captured by a microphone in the far-field of the microphone.

Example 20 includes the subject matter of any of Examples 17-19, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 21 is a system for enhancement of a speech signal, the system comprising: means for performing de-reverberation (DRV) processing on first and second signals received from first and second microphones, respectively, the first and second signals each comprising a combination of speech and noise; means for generating first and second time-frequency masks (TFMs), each of the first and second TFMs associated with a corresponding one of the DRV processed first and second signals, each of the first and second TFMs comprising elements indicating a probability that a time-frequency component of the DRV processed signal associated with that TFM element includes speech, wherein the TFM generation is based on application of a recurrent neural network (RNN) to the DRV processed first and second signals; means for generating steering vectors based on speech covariance matrices and noise covariance matrices, the first and second TFMs employed to filter speech components of the DRV processed first and second signals, respectively, for calculation of the speech covariance matrices, and to filter noise components of the DRV processed first and second signals for calculation of the noise covariance matrices; and means for performing beamforming on the DRV processed first and second signals, based on the steering vectors, to generate a single channel speech signal.

Example 22 includes the subject matter of Example 21, the system further comprising means for performing Improved Minima Controlled Recursive Averaging to reduce stationary noise components of the single channel speech signal.

Example 23 includes the subject matter of Examples 21 or 22, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 24 includes the subject matter of any of Examples 21-23, wherein the beamforming employs Generalized Eigenvalue beamforming with Blind Analytical Normalization.

Example 25 includes the subject matter of any of Examples 21-24, wherein the first and second signals are received from a far-field of the first and second microphones.

Example 26 includes the subject matter of any of Examples 21-25, the system further comprising means for providing the single channel speech signal to at least one of an Automatic Speech Recognition (ASR) engine, a keyword spotting application, a wake-on-voice (WoV) application, and a voice over internet protocol (VOIP) application.

Example 27 is a system for enhancement of a speech signal, the system comprising: means for performing de-reverberation (DRV) processing on a signal received from a microphone, the signal comprising a combination of speech and noise; means for generating a time-frequency mask (TFM) associated with the DRV processed signal, the TFM comprising elements indicating a probability that a time-frequency component of the DRV processed signal associated with that TFM element includes speech, wherein the TFM generation is based on application of a recurrent neural network (RNN) to the DRV processed signal; and means for performing noise reduction on the DRV processed signal to generate an enhanced speech signal, the noise reduction employing the TFM to identify noise to be filtered.

Example 28 includes the subject matter of Example 27, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

Example 29 includes the subject matter of Examples 27 or 28, wherein the received signal is received from a far-field of the microphone.

Example 30 includes the subject matter of any of Examples 27-29, the process further comprising means for providing the enhanced speech signal to at least one of an Automatic Speech Recognition (ASR) engine, a keyword spotting application, a wake-on-voice (WoV) application, and a voice over internet protocol (VOIP) application.

Example 31 is a system for training a recursive neural network (RNN) to generate a time-frequency mask (TFM), the system comprising: means for selecting a sample clean-speech signal from a speech database; means for selecting a reverberation filter from a filter database; means for selecting a sample noise-signal from a noise database; means for scaling the sample noise-signal based on a selected signal to noise ratio (SNR); means for applying the reverberation filter to the sample clean-speech signal, and adding the scaled sample noise-signal to the result of the reverberation filter application, to generate a noisy-speech signal; means for generating an estimated TFM based on application of the RNN to features extracted from the noisy-speech signal; means for generating a target TFM based on a ratio of features extracted from the sample clean-speech signal to the features extracted from the noisy-speech signal; means for and training the RNN based on a calculated error between the estimated TFM and the target TFM.

Example 32 includes the subject matter of Example 31, further comprising means for iterating the method for training the RNN to generate the TFM based on additional selections of the sample clean-speech signal, the reverberation filter, the sample noise-signal, and the SNR.

Example 33 includes the subject matter of Examples 31 or 32, wherein the reverberation filter is to simulate far-field environmental effects on a signal captured by a microphone in the far-field of the microphone.

Example 34 includes the subject matter of any of Examples 31-33, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one non-transitory computer readable storage medium having instructions encoded thereon that, when executed by one or more processors, cause a process to be carried out for enhancement of a speech signal, the process comprising:
performing de-reverberation (DRV) processing on first and second signals received from first and second microphones, respectively, the first and second signals each comprising a combination of speech and noise;
generating first and second time-frequency masks (TFMs), each of the first and second TFMs associated with a corresponding one of the DRV processed first and second signals, each of the first and second TFMs comprising elements indicating a probability that a time-frequency component of the DRV processed signal associated with that TFM element includes speech, wherein the TFM generation is based on application of a recurrent neural network (RNN) to the DRV processed first and second signals;
employing the first and second TFMs to filter the DRV processed first and second signals to generate first and second speech components: calculating speech covariance matrices based on the first and second speech components:
employing the first and second TFMs to filter the DRV processed first and second signals to generate first and second noise components: calculating noise covariance matrices based on the first and second noise components:
generating steering vectors based on the speech covariance matrices and the noise covariance matrices and performing beamforming on the DRV processed first and second signals, based on the steering vectors, to generate a single channel speech signal.

2. The non-transitory computer readable storage medium of claim 1, the process further comprising performing Improved Minima Controlled Recursive Averaging to reduce stationary noise components of the single channel speech signal.

3. The non-transitory computer readable storage medium of claim 1, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

4. The non-transitory computer readable storage medium of claim 1, wherein the beamforming employs Generalized Eigenvalue beamforming with Blind Analytical Normalization.

5. The non-transitory computer readable storage medium of claim 1, wherein the first and second signals are received from a far-field of the first and second microphones.

6. The non-transitory computer readable storage medium of claim 1, the process further comprising providing the single channel speech signal to at least one of an Automatic Speech Recognition (ASR) engine, a keyword spotting application, a wake-on-voice (WoV) application, and a voice over internet protocol (VOIP) application.

7. A system for pre-processing of a speech signal, the system comprising: a de-reverberation (DRV) circuit to perform DRV processing on a plurality of signals received from an array of microphones, the signals comprising a combination of speech and noise; a time-frequency mask (TFM) estimation circuit to generate a plurality of TFMs, each of the TFMs associated with one of the DRV processed signals, the TFMs comprising elements indicating a probability that a time-frequency component of the DRV processed signal associated with that TFM element includes speech, wherein the TFM generation is based on application of a recurrent neural network (RNN) to the DRV processed signals; a beamforming circuit to employ the TFMs to filter the DRV processed signals to generate speech components and calculate speech covariance matrices based on the speech components; the beamforming circuit further to employ the TFMs to filter the DRV processed signals to generate noise components and calculate noise covariance matrices based on the noise components; the beamforming circuit further to generate steering vectors based on the speech covariance matrices and the noise covariance matrices; and the beamforming circuit further to perform beamforming on the plurality of DRV processed signals, based on the steering vectors, to generate a single channel speech signal.

8. The system of claim 7, further comprising a post filtering circuit to perform Improved Minima Controlled Recursive Averaging to reduce stationary noise components of the single channel speech signal.

9. The system of claim 7, wherein the RNN comprises a first Affine layer with a hyperbolic tangent activation function, a second Affine layer with a hyperbolic tangent activation function, a third Long Short-Term Memory (LSTM)

layer with a sigmoid activation function, a fourth Long Short-Term Memory (LSTM) layer with a sigmoid activation function, and a fifth Affine layer with a sigmoid activation function.

10. The system of claim 7, wherein the beamforming employs Generalized Eigenvalue beamforming with Blind Analytical Normalization.

11. The system of claim 7, wherein the plurality of received signals are received from a far-field of the microphones.

12. The system of claim 7, wherein the single channel speech signal is provided to at least one of an Automatic Speech Recognition (ASR) engine, a keyword spotting application, a wake-on-voice (WoV) application, and a voice over internet protocol (VOIP) application.

13. At least one non-transitory computer readable storage medium having instructions encoded thereon that, when executed by one or more processors, cause a process to be carried out for enhancement of a speech signal, the process comprising:
  performing de-reverberation (DRV) processing on a signal received from a microphone, the signal comprising a combination of speech and noise;
  generating a time-frequency mask (TFM) associated with the DRV processed signal, the TFM comprising elements indicating a probability that a time-frequency component of the DRV processed signal associated with that TFM element includes speech, wherein the TFM generation is based on application of a recurrent neural network (RNN) to the DRV processed signal; and
  performing noise reduction on the DRV processed signal to generate an enhanced speech signal, the noise reduction employing the TFM to identify noise to be filtered.

14. The non-transitory computer readable storage medium of claim 13, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

15. The non-transitory computer readable storage medium of claim 13, wherein the received signal is received from a far-field of the microphone.

16. The non-transitory computer readable storage medium of claim 13, the process further comprising providing the enhanced speech signal to at least one of an Automatic Speech Recognition (ASR) engine, a keyword spotting application, a wake-on-voice (WoV) application, and a voice over internet protocol (VOIP) application.

17. A processor-implemented method for training a recurrent neural network (RNN) to generate a time-frequency mask (TFM), the method comprising: selecting, by a processor-based system, a sample clean-speech signal from a speech database;
  selecting, by the processor-based system, a reverberation filter from a filter database;
  selecting, by the processor-based system, a sample noise-signal from a noise database;
  scaling, by the processor-based system, the sample noise-signal based on a selected signal to noise ratio (SNR);
  applying, by the processor-based system, the reverberation filter to the sample clean-speech signal, and adding the scaled sample noise-signal to the result of the reverberation filter application, to generate a noisy-speech signal;
  generating, by the processor-based system, an estimated TFM based on application of the RNN to features extracted from the noisy-speech signal;
  generating, by the processor-based system, a target TFM based on a ratio of features extracted from the sample clean-speech signal to the features extracted from the noisy-speech signal; and
  training, by the processor-based system, the RNN based on a calculated error between the estimated TFM and the target TFM.

18. The method of claim 17, further comprising iterating the method for training the RNN to generate the TFM based on additional selections of the sample clean-speech signal, the reverberation filter, the sample noise-signal, and the SNR.

19. The method of claim 17, wherein the reverberation filter is to simulate far-field environmental effects on a signal captured by a microphone in the far-field of the microphone.

20. The method of claim 17, wherein the RNN comprises a first Affine layer with a hyperbolic tangent activation function, a second Affine layer with a hyperbolic tangent activation function, a third Long Short-Term Memory (LSTM) layer with a sigmoid activation function, a fourth Long Short-Term Memory (LSTM) layer with a sigmoid activation function, and a fifth Affine layer with a sigmoid activation function.

* * * * *